United States Patent Office 3,729,298
Patented Apr. 24, 1973

3,729,298
SOLID REFUSE DISPOSAL PROCESS
AND APPARATUS
John Erling Anderson, Katonah, N.Y., assignor to Union
Carbide Corporation, New York, N.Y.
Filed July 9, 1971, Ser. No. 161,107
Int. Cl. C10j 3/00, 3/20
U.S. Cl. 48—111                                    25 Claims

ABSTRACT OF THE DISCLOSURE

A process for disposing of refuse by thermally decomposing it in a shaft furnace and simultaneously producing a fuel or synthesis gas containing over 50% CO and $H_2$. A gas containing at least 40% oxygen is fed into the furnace at a rate of 0.15–0.28 ton of $O_2$ per ton of refuse to create a sufficiently high thermal driving force in the hearth to melt and fluidize the non-combustible inorganic matter and to permit molten metal and slag to be tapped from the base of the furnace without causing over oxidation of the refuse. The metal and slag will solidify to an inert compact residue. The relatively small volume of gas produced from the combustible organic portion of the refuse renders it easy to clean of pollutants prior to further treatment or utilization. The process may be used in combination with an oxygen plant in an integrated system which leaves a major portion of the gas produced available for use.

BACKGROUND

The invention relates, in general, to a total incineration process for disposing of solid refuse and, more particularly, to a solid waste disposal process in which oxygen or oxygen enriched air is used to convert solid waste in a shaft type furnace to molten metal and slag, and a flue gas having chemical raw material or fuel value while causing minimal air and water pollution.

The efficient disposal of refuse is a problem of prime concern for every major urban center. High population densities in the cities coupled with a lack of space available for landfill operations have made the disposal of municipal waste material the focal point of much recent public attention. Conventional methods of refuse incineration are inefficient and a source of air or water pollution. The pollutants which they produce may be present in stack gases as solid, liquid or gaseous phases. Organics such as acids, aldehydes and hydrocarbons, as well as carbon monoxide are generally present in combustion stack gas as by-products of incomplete combustion, resulting from insufficient oxygen, poor mixing, or low temperature. Sulfur dioxide results from the combustion of sulfur-bearing compounds. Fly ash, an objectionable solid contaminant, consists of unburned organic matter or inorganic matter originally present in the fuel. Apart from its effect on environmental pollution, fly ash can be detrimental to equipment. For example, when the sensible heat of a hot flue gas is utilized for steam generation, erosion and corrosion of the boiler tubes is frequently caused by the presence of fly ash.

Control methods and pollution abatement devices which have been used in the past to reduce the level of pollutants in combustion processes, such as refuse incinerators, have been only partially successful. Stack gases are generally treated by water scrubbing, electrostatic precipitation or filtration to remove most of the pollutants prior to venting the gases to the atmosphere. However, the large volume of stack gases from conventional combustion processes makes gas cleaning a difficult and expensive operation. Moreover, the total quantity of pollutants remaining in the stack gas after cleaning is increased appreciably due to dilution of the stack gas with nitrogen originating in the combustion air. This is especially true when large amounts of excess combustion air are used—as is the common practice, for example, in refuse incineration processes.

The problem relating to refuse disposal are not confined solely to atmospheric pollution. The solid residue obtained from conventional incinerators represent another troublesome area, inasmuch as it has not generally undergone reduction to its minimal volume and is therefore bulky and difficult to handle. In addition, it contains unburned material and can, in some cases, be biologically active. Consequently, such residue is undesirable as landfill and its ultimate disposal remains a problem.

There is also increasing concern about the wasteful decomposition of solid refuse, with little consideration being given for its by-product value to recycle back into the economy. Solid refuse can be an important source of raw material, for example, a source of chemicals, fuel, glass and metal. As our natural resources become depleted, it becomes increasingly important that we utilize our wastes as efficiently as possible.

In efforts to produce a readily disposable residue material from a wide range of refuse compositions, processes for total refuse incineration have received much attention in recent years. However, the concept of disposing of solid waste in such manner as to reduce the noncombustible matter to molten metal and slag, and the combustibles to gaseous matter, in a vertical shaft furnace, by feeding in waste at the top and preheated air at the base is not new, as evident from U.S. Pat. No. 211,503 which issued to H. R. Foote in 1879.

A more technologically sophisticated version of a similar process is disclosed in U.S. Pat. No. 3,511,194 to Stookey which describes a process wherein preheated air fed at the base of a shaft furnace, reacts with refuse descending through the furnace. Molten metal and slag are tapped at the base of the furnace, while hot gases rise countercurrent to the descending refuse and thermally decompose it to form gas, liquid hydrocarbons, and char. The gas leaving near the top of the shaft is combustible, and is burned to completion in a secondary combustion chamber with additional air. The flue gas from the combustion chamber may be cooled by quenching or by utilizing its sensible heat in a waste heat boiler prior to cleaning by means of bag filters.

The Stookey process like the Foote process suffers from serious disadvantages. Both processes are predicated on the ability to transfer heat at the base of the shaft furnace by burning the descending char with preheated air. But heat transfer by this mode is at best marginal under the conditions required in the hearth to maintain the iron molten and to prevent the formation of corrosive iron oxide. Consequently, as the refuse composition varies, the temperature in the hearth can drop below the point where the slag and metal are sufficiently fluid to tap, thereby seriously interfering with operation of the process. A further disadvantage results from the nature of the combustible gases leaving the furnace. The presence of nitrogen in the oxidant gas (i.e. air) dilutes the combustible gas leaving the shaft and thereby substantially reduces its heating value. Moreover, the high dilution with nitrogen also destroys the potential utility of the gas as a chemical raw material.

A still further disadvantage of the Stookey process is that the combustible gas leaving the shaft is completely oxidized in a secondary combustion chamber prior to gas cleaning. This secondary oxidation requires the introduction of still more air and consequently nitrogen into the gas stream, thereby further increasing its volume, lowering the concentration of pollutant matter therein, and making the overall cleaning operation of the ultimate gases exhausted to the atmosphere inefficient and costly.

An analysis of the heat transfer rate at the hearth or base zone of the shaft furnace illustrates the difficulty of maintaining a countercurrent operation while using preheated or fuel-enriched air as the oxidant. The prime requisite for continuous operation of the furnace is that the hearth temperature be approximately 3000° F. to insure the fluidity of the metal and slag in the base of the furnace. High rates of heat transfer are therefore imperative. However, the use of an oxidant with a low oxygen concentration, such as air, even with high preheat temperatures, will always result in marginal or unacceptable heat transfer rates at the furnace hearth. Surprisingly, even the addition of an auxiliary fuel, such as methane, injected along with the preheated air is of little value under reducing conditions and may under certain conditions be detrimental. That is, the auxiliary fuel may actually cool the hearth rather than heat it.

The use of pure oxygen to enrich the combustion air in a refuse incinerator has also been suggested. In an article by Zinn et al. ("Total Incineration," pages 116–127, Proceedings of 1970 National Incinerator Conference, May 17–20, 1970) a shaft furnace is depicted in which refuse descends from the top and an oxygen enriched air blast enters from the bottom, thereby maintaining the requisite temperature of 3000° F. in the hearth where fluid slag is removed. The combustible gas discharged from the top of the furnace is completely burned with air in a secondary combustion chamber prior to cleaning. Although conceptually attractive insofar as heat transfer considerations in the hearth are concerned, the operating conditions of this system impose inherent limitations which are commercially unacceptable. Specifically, the major drawbacks of the system, to a great extent, are attributable to the high ratio of oxygen required per ton of refuse to be processed. Zinn et al. specify 0.3 to 0.4 ton of oxygen per ton of refuse. This leads to several problems which are incompatible with an efficient incineration process.

First, the high ratio of oxygen to refuse creates undesirable oxidizing conditions in the hearth. It is desirable to limit the oxidizing conditions in the hearth and preferably to mantain a reducing atmosphere. With the high oxygen consumption specified by Zinn et al., the iron would react rapidly to form iron oxide causing thick brown fumes and corrosion to the refractory lining of the hearth. Further, an over abundance of oxygen in the hearth causes excessively high temperatures throughout the furnace with the concomitant wearing away of the refractory lining.

In addition, another major disadvantage of Zinn et al. high ratio of oxygen to refuse is that the fuel value and potential chemical value of the gas leaving the shaft furnace is adversely effected by the excessive amounts of oxygen consumed. For example, in the presence of excessive amounts of oxygen in the furnace—part of the combustible gaseous constituents, such as CO and $H_2$, become oxidized to $CO_2$ and $H_2O$, respectively, thereby sharply reducing the fuel value of the flue gas. For similar reasons, the chemical value of the gas as a synthesis or reducing gas is also virtually destroyed. Furthermore, the inefficiency of the system resulting from the use of too much oxygen causes excessively high exit temperatures in the gas leaving the shaft. This imposes a heavy thermal load on the gas cooling equipment which must cool and reduce the volume of the flue gas prior to the cleaning operation.

In common with Foote and Stookey, the Zinn et al. process is also faced with the formidable problem of cleaning the large volume flue gas which leaves the secondary combustion chamber. In other words, the amount of pollutant material in the flue or stack gas must be reduced to a tolerable level prior to being vented to the atmosphere. The dimensions of this problem can best be appreciated by considering the fact that a well designed electrostatic precipitator or liquid scrubber can reduce the particulate matter in a gas stream to a concentration of about 0.003 lb./1,000 cu. ft. of gas treated. With a conventional incinerator, approximately 600,000 cu. ft. of stack gases have to be cleaned for each ton of refuse consumed. After cleaning, this leaves about 1.8 lbs. of particulate matter in the stack gases per ton of refuse consumed. In the process described by Stookey, the amount of gas to be treated is reduced to about 200,000 cu. ft. per ton of refuse, and this decreases the amount of particulate matter after cleaning to about 0.6 lb. per ton of refuse. However, the present need to improve our environment demands substantial reductions in the level of air pollutants beyond that obtainable even with the Stookey process.

OBJECTS

Accordingly, it is an object of this invention to provide an efficient method of refuse disposal, using minimal amounts of oxygen and producing minimal volumes of flue gas. It is another object of this invention to provide a method for refuse disposal which will produce a flue gas having by-product value as a fuel or as a synthesis gas for chemical manufacture and an inert compact solid residue having metallic by-product value. It is another object of this invention to provide an integrated system which disposes of refuse and produces energy in excess of that required to power the system.

SUMMARY OF INVENTION

These and other objects which will become apparent from the detailed disclosure and claims to follow are achieved by the present invention, one aspect of which comprises:

A process which disposes of refuse by converting it to useful gaseous products and inert compact residue, comprising the steps of:

(1) providing a substantially vertical shaft furnace having a drying zone in the top portion, a thermal decomposition zone in the mid-portion and a combustion and melting zone in the bottom portion thereof, (2) feeding refuse containing a combustible organic portion and a non-combustible inorganic portion into the upper portion of said drying zone, (3) feeding a gas containing at least 40 percent oxygen by volume into said combustion and melting zone, in an amount such that the weight ratio of oxygen to refuse entering the shaft furnace is in the range of from about 0.15–0.28 to 1, (4) thermally decomposing, in said thermal decomposition zone, the organic portion of said refuse to char and gaseous material by direct contact with the hot combustion gases rising from the combustion and melting zone, (5) combusting the char, which descends into the combustion and melting zone, with said oxygen containing feed gas to produce hot gaseous products, primarily carbon monoxide and hydrogen, thereby generating sufficient heat at a sufficiently high thermal driving force to melt and fluidize the inorganic portion of said refuse to molten metal and slag, (6) discharging the gaseous products produced in said shaft furnace from the drying zone, said gaseous products being characterized by containing, on a dry volume basis, at least 50% hydrogen and carbon monoxide, and having a heating value greater than 200 B.t.u./ c.f. of dry gas at 70° F. and atmospheric pressure, and (7) discharging the molten metal and fluid slag from the combustion and melting zone and thereafter permitting same to solidify to a compact inert residue.

Another aspect of the present invention relates to an integrated system or process which disposes of refuse and at the same time is capable of producing useful energy in excess of that required for operation of the system in the form of gas having a fuel value greater than 200 B.t.u./c.f. at 70° F. and atmospheric pressure, comprising the steps of:

(1) thermally decomposing refuse in a shaft furnace into which a gas is fed containing at least 40% $O_2$ by volume, at such rate that the weight ratio of $O_2$ to refuse is maintained in the range of from about 0.15–0.28 to 1, thereby creating a sufficiently high thermal driving force in the hearth of such shaft furnace to produce molten metal and slag which are discharged from the base portion of said furnace, and producing a gas having a temperature below 500° F., a moisture content of from about 25 to 55%, (by volume) and containing at least 50% (by volume on a dry basis) of CO and $H_2$, said gas being discharged from the top portion of said furnace, (2) cleaning the gas discharged from said furnace of pollutants, (3) separating a minor portion of the cleaned gas from the major product portion thereof, and feeding said minor portion to an oxygen plant wherein it is burned to produce the energy required for operation of the oxygen plant, (4) utilizing said energy to separate oxygen from air fed to said oxygen plant, and feeding the oxygen produced into said shaft furnace in accordance with step (1), whereby the major product portion of the cleaned gas produced by the system remains available for use.

In a preferred embodiment of the above system, the pollutants are cleaned from the gas by scrubbing with water. In a still more specific preferred embodiment of the invention, the above system contains the following additional steps: (5) the scrubbed gas is dried by condensing the water vapor therefrom, (6) the liquid effluent resulting from the scrubbing step is collected and separated into an organic phase and an aqueous phase containing fly ash, (7) the aqueous phase is filtered to separate the fly ash, (8) a portion of the filtered aqueous phase and the condensate from the condenser are used as water for the scrubbing step, the remainder of the filtered aqueous phase being discarded, and (9) the filtered fly ash is mixed with said organic phase and the mixture is recycled to the furnace.

The term "refuse" as used throughout the present specification and claims is used to mean conventional municipal (i.e. household and commercial) refuse or garbage, including combustible materials such as paper, plastics, rubber, leather, textiles, wood, and food waste, and non-combustible materials, such as metal, glass and cementitious materials which can be melted or fused within the shaft furnace in accordance with the present invention. In addition, refuse normally contains a fairly large amount of water, mostly absorbed by the porous solids. The term "refuse" is also meant to include a wide variety of matter ordinarily found in industrial refuse, such as scrap metal and sludge, which can be processed by the present invention together with municipal refuse. Thus, for example, scrap metal may be added to municipal refuse if it is desired to convert the scrap metal into a molten metal product. In such instances, the municipal refuse serves as the source of fuel and carbon. As another example, sludge (i.e. the solid-water residue from sewage treatment plants) and a wide range of industrial refuse can also be decomposed along with municipal refuse in accordance with the present invention.

The term "pollutant" as used herein is intended to mean toxic and noxious by-products of combusiton which cannot be vented freely into the atmosphere. Thus, the term includes solid particulate matter, such as fly ash, as well as vapors and fumes such as $SO_2$, NO, HCl, organics such as acetic acid, and hydrocarbons such as methane, pentane and hexane.

The term "slag" as used herein is intended to mean the inorganic portion of the refuse which is not combustible, and which becomes fused in the reactor and tapped from the base thereof in a molten or fluid condtion. The slag is formed predominantly of materials such as glass and cementitious materials. If the hearth is operated under mildly oxidizing conditions, it will also contain some oxidized metal. If, however, the hearth is operated under reducing conditions, the slag will be substantially free of metal oxides and can be tapped from the shaft reactor as a separate stream from the molten metal phase, since under such conditions the slag and metal tend to separate, with the slag layer floating upon the molten metal. Molten metal and slag may be tapped either periodically or continuously. Thereafter, these streams may be permitted to solidify into an inert compact residue which can be used as sanitary land fill, or, if desired, can be further processed directly (i.e. prior to solidification) to increase their value; for example, the molten glass can be spun and the molten metal refined or cast.

The term "fluidize" or "fluidizing" as used herein is intended to mean conversion of the material from a solid to a liquid state at a temperature sufficiently high to cause the material to flow easily.

The weight ratio of oxygen to refuse fed into the shaft furnace is a critical operating parameter of the present invention. A ratio greater than about 0.28 renders the process inoperable insofar as the desired results of the present invention are concerned, namely the production of a flue gas having a fuel value greater than 200 B.t.u./ft.$^3$ at 70° F. Furthermore, use of an oxygen to refuse ratio greater than 0.28 increases operating costs due to the increased consumption of oxygen, produces a flue gas containing a greater percentage of oxygenated products thereby lowering its fuel value, and produces high furnace temperatures resulting in equipment erosion and undesirably hot flue gas. On the other hand, a weight ratio lower than about 0.5 results in insufficient energy being available to supply the furnace's endothermic requirements, causing: low temperatures in the combustion and melting zone, unburned material to be present in the residue, solidification of the metal and slag in the base of the furnace, and build-up of refuse at the top of the furnace. The preferred weight ratio of oxygen to refuse is from about 0.18 to 0.22.

The oxygen containing gas for use in the present invention must contain at least 40% oxygen by volume in order that it supply sufficient energy to the system. Such a gas is preferably made by enriching air with oxygen gas. Oxygen concentrations greater than 40% may also be used, with pure oxygen being the most preferred from a technical point of view. Economics will dictate the exact amount of oxygen, between the limits of 40 to 100%, to be used in a given situation depending also on the composition and moisture content of the refuse.

One of the significant advantages of the present invention is the useful nature of the gaseous product produced and discharged from the top of the furnace. This product gas, due to its composition, is high in heating value making a valuable fuel and rendering the overall process a net producer of energy. The product gas contains a minimum of 50% (by volume) carbon monoxide and hydrogen, and preferably 70 to 85% of these two gases. Its fuel value is at least 200 B.t.u. per cubic foot of dry gas at 70° F. and atmospheric pressure and preferably 250 to 350 B.t.u./c.f. Furthermore, the combined effect of having little or no nitrogen, together with its low temperature at the point of discharge from the furnace causes the volume of the product gas to be very small compared to prior art methods of waste disposal. This low volume renders any cleaning of the gas, to free it of solid matter, a relatively easy matter. Surprisingly, the gas at the point of discharge from the furnace is below 500° F. and may be maintained as low as 180° F. to 250° F. This is indeed unexpected when it is considered that even in a large commercial sized unit which is only about 20 feet high, temperatures on the order of 3000° F. are maintained at the base of the furnace to melt and fluidize the metal and slag.

DETAILED DESCRIPTION OF THE INVENTION

Figure 1:
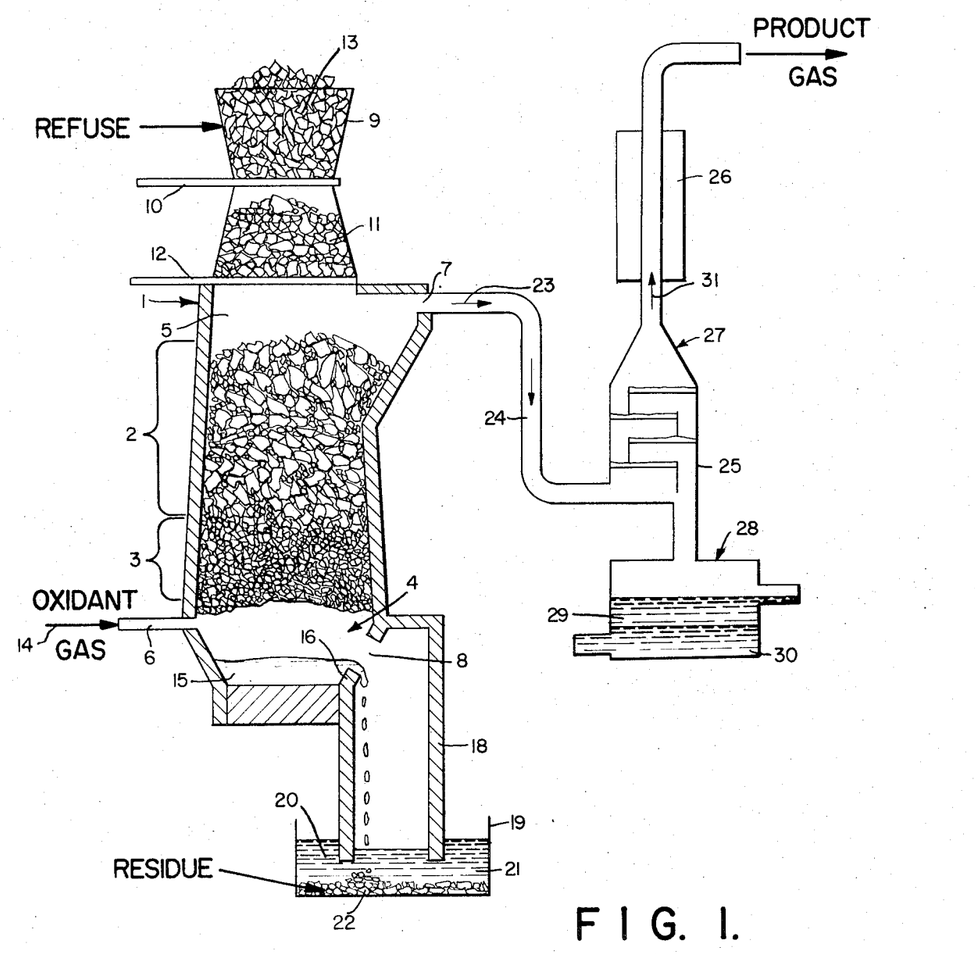
FIG. 1 is a schematic cross-sectional view of the shaft furnace an associated apparatus useful in the practice of the present invention.

Referring to FIG. 1, there is shown a shaft reactor or furnace 1 containing a drying zone 2 in the upper portion thereof, a thermal decomposition zone 3 in the midportion thereof, and a combustion and melting zone 4 in the bottom portion thereof. At the very top portion of the furnace, there is an essentially open head space 5 wherein the gas separates or disengages from large pieces of entrained solids. Shaft furnace 1 may be constructed of a cylindrical metallic shell, with the combustion and melting zone 4 (which is also referred to as the hearth) lined with refractory brick (not shown) in order to withstand the high temperature, on the order of 3000° F., which is maintained in the hearth 4. The drying zone portion 2 of the shaft furnace may be constructed of metal alone, or may be insulated (not shown) in order to conserve heat and maintain more uniform temperature conditions in the shaft furnace. Shaft furnace 1 is provided with an oxidant gas inlet port 6, a gas discharge port 7 and a tap hole 8 for the molten material. A refuse feed hopper 9, which communicates through valve 10 with chute 11, is fixedly attached to the top of shaft furance 1. A second valve 12 is used in combination with valve 10 to maintain the shaft reactor 1 sealed while refuse is being fed.

In operation, refuse 13—which requires no pretreatment—is fed into refuse feed hopper 9. Valves 10 and 12, which may, for example, be slide valves or butterfly valves, serve in combination to seal the shaft furnace during refuse feeding in order to maintain positive pressure within furnace 1. This is accomplished by opening valve 10 while maintaining valve 12 in a closed position, permitting the refuse 13 in hopper 9 to drop into chute 11. Thereafter, the position of valves 10 and 12 is reversed, such that valve 10 is first closed and valve 12 then opened, permitting the refuse in chute 11 to drop into the furnace 1.

It will be evident that if a continuous rather than an intermittent system of feeding refuse is desired, a single rotary valve may be used in place of the two slide or butterfly valves 10 and 12, since a rotary valve will maintain a pressure tight seal while continuously feeding solid material. However, such a system would require shredding of the refuse to a suitable size in order that it fit through the pockets of the rotary valve.

The refuse as its drops into the top of shaft furnace 1 passes through the drying zone 2, wherein most of its moisture content is evaporated. The temperature in zone 2, particularly in the upper portion thereof, is maintained below 500° F., preferably in the range of 180° to 250° F. The dried refuse then proceeds down shaft furnace 1 under the influence of gravity into the thermal decomposition zone 3, wherein the organic combustible material is decomposed primarily to char, which is predominantly carbon, to carbon monoxide, hydrogen and water vapor, and to lesser amounts of carbon dioxide and organic vapors. Metal, cementitious materials, glass and like non-combustibles together with the char proceed further down the shaft furnace into the combustion melting zone 4, wherein the char reacts exothermically with the oxidant gas 14 which enters the furnace through port 6 creating the heat necessary to melt the metallic portions of the refuse and to fluidize the glass and other cementitious matter to a fluid slag which collect as a molten pool 15 in the base of shaft furnace 1. The pool 15 of fluid metal and slag overflows lip 16 and is discharged from shaft furnace 1 through tap hole 8, falling down through the refractory lined chute 18 into a water quenched tank 19 wherein the metal and slag solidify in granular form and settle to the bottom of the tank. The level 20 of the water 21 in tank 19 is higher than the bottom of chute 18 in order to maintain the furnace pressure tight. The molten metal and slag in pool 15 tend, under reducing conditions in the hearth, to separate, with the fluid slag forming a floating layer (not shown) on top of the molten metal in pool 15. As a result, the slag and metal may be tapped as separate streams (not shown) or if quenched as shown, they form discrete particles of metal and slag residue 22, rendering subsequent separation of the metal from the slag relatively easy, for example, by magnetic separation. Under mildly oxidizing conditions in the hearth, a single fluid slag, containing the metal primarily in oxide form, is formed.

The hot gaseous combustion products formed by the char-oxygen reaction in the hearth 4, primarily carbon monoxide and hydrogen due to the reducing conditions maintained in hearth 4, rise counter-current to the descending refuse. The rising hot gases pass first through thermal decomposition zone 3, where they give up part of their sensible heat energy to thermally decompose the organic portion of the refuse into gaseous constituents and char, and then further up the shaft furnace into the drying zone 2 where more of their heat is given up in vaporizing the moisture in the descending refuse. The gaseous products which leave the shaft furnace 1 through port 7 consist of water vapor, the volatilized constituents of the refuse, as well as any nitrogen which came in with the oxidant gas 14. In addition, the exiting gas 23 contains a small quantity of entrained fly ash and a fine mist of condensed liquid organics.

The composition of the gas discharged from shaft furnace 1 through port 7 will vary somewhat depending upon the nature of the refuse. However, due to the critical operating conditions maintained in the shaft furnace, the gas composition 23 will be relatively stable and in the range of compositions disclosed in Table I below.

TABLE I

Gas analysis

|  | (Dry volume basis, percent) |
|---|---|
| CO | 32–54 |
| $H_2$ | 18–31 |
| $CO_2$ | 9–25 |
| $CH_4$ | 2–6 |
| Higher organics | 0.5–2 |
| Nitrogen | 0.2–30 |

The nitrogen content of the gas in determined almost entirely by the amount of nitrogen in the oxidant gas. When pure oxygen is used, the nitrogen in the product gas is less than 1%, and when the oxidant contains only 40% oxygen, the nitrogen in the product gas will be about 30%. The water vapor in the wet gas will vary from about 25 to 55% (by volume) depending primarily upon the amount of free moisture in the refuse; the water vapor in the wet gas is typically about 40% by volume.

The heating value of the above gas (on a dry basis) will vary from about 200 to 350 B.t.u./c.f. at 70° F. and atmospheric pressure. From Table I above it can be seen that at least 50% of the gas consists of carbon monoxide and hydrogen. Such gas is useful either as a fuel gas because of its high B.t.u. value or as a synthesis gas, for example, for making methanol. The dry product gas has a flame temperature and heat transfer characteristics similar to that of natural gas. In addition, its relatively small volume, due to the small amount of nitrogen and lower temperature, renders its subsequent purification of fly ash and moisture relatively simple and inexpensive, permitting such purification to be carried out at reasonable cost prior to complete oxidation.

The gas 23 in line 24 is cleaned by being fed into gas scrubber 25 where the pollutants such as fly ash, HCl, NO, $SO_2$ and condensable organic compounds are washed out of the gas in accordance with techniques well known in the art. The gas 31 rising from scrubber 25 is passed through a condenser 26 where substantially all of the water vapor in the gas is condensed, such that a dry gas having the compositions shown in Table I above is produced. The wash water 27 from scrubber 25 together with the water condensed out of the gas flows down through scrubber 25, serving as the cleaning fluid for the gas, and is collected in a settling tank 28. The effluent which is collected in the settling tank 28 may be buffered chemically, for example with calcium carbonate, in order to neturalize the HCl and other acids present in the effluent.

Figure 2:
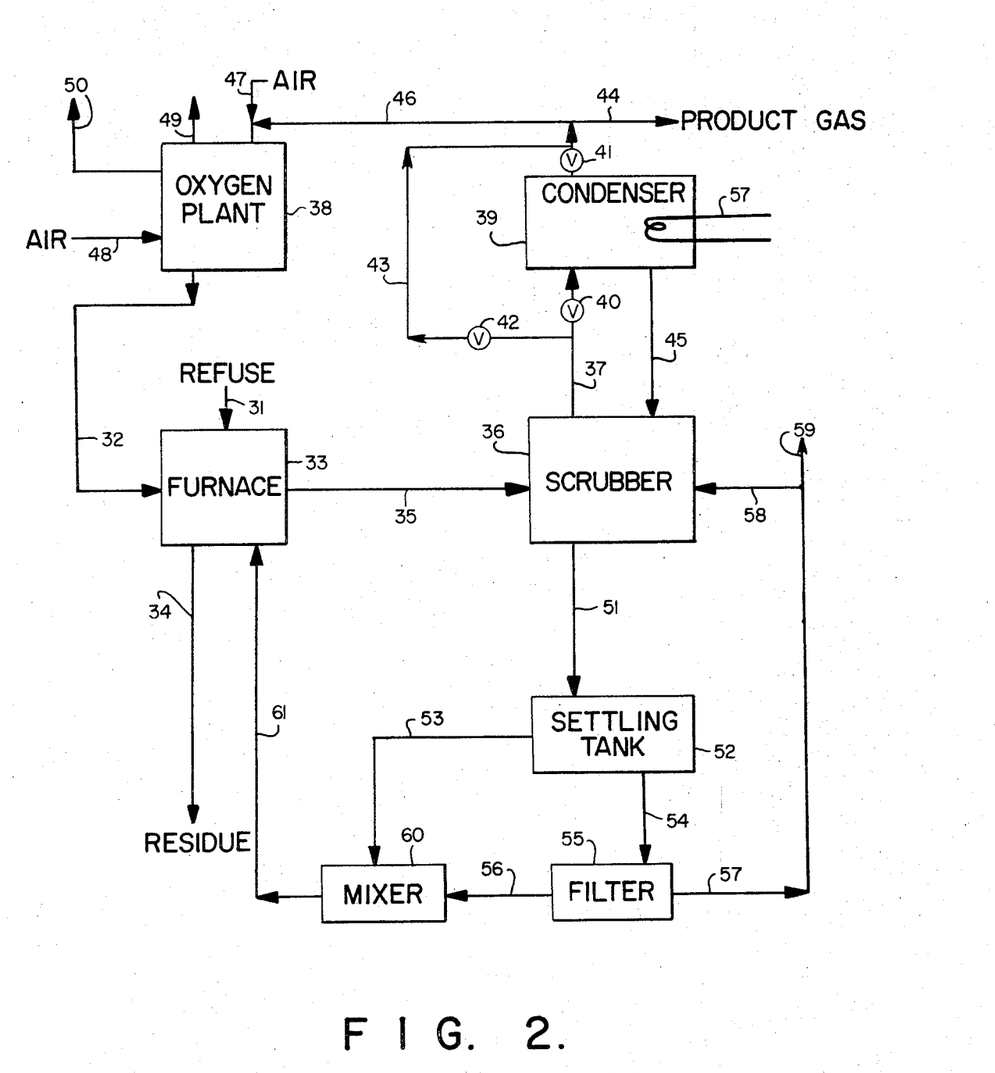
FIG. 2 is a schematic diagram illustrating a total refuse converter system embodying the present invention.

The effluent in settling tank 28 will separate into an upper organic layer 29 and a lower aqueous layer 30. The organic layer or phase 29 consists primarily of condensed organics and some fly ash. The fly ash in the aqueous phase 30 may be separated from the water, for example, by filtration. Part of the clarified waste water may then be recycled and used as the wash water in the scrubber and the filtered fly ash mixed with the organic phase 29 and then recycled to the furnace 1 as shown in FIG. 2. The remaining clarified waste water is discharged from the system.

FIG. 2 is a schematic flow sheet illustrating a total refuse converter system embodying the present invention. Refuse 31 and oxygen 32 (or oxygen enriched air containing at least 40% $O_2$) are fed into furnace 33 wherein the refuse is decomposed into molten metal and slag which is discharged from the base of the furnace as residue 34 and a wet effluent gas 35 which is discharged from the top of furnace 33. The wet gas 35 is fed into scrubber 36. The wet scrubbed gas 37 may be fed either directly to the oxygen plant 38 and used as fuel or to the condenser 39. If the condenser 39 is to be by-passed, valves 40 and 41 are closed and valve 42 is open to permit the wet scrubbed gas to pass through by-pass line 43 from whence it is directed in part through line 46 to the oxygen plant 38 and in part out the product line 44. If the gas is to be dried, then valves 40 and 41 are opened and 42 is closed permitting the wet scrubbed gas to rise into condenser 39, through which cooling water 57 serves to remove the heat of condensation and the condensate 45 from gas 37 falls back down into the scrubber 36. The dried product gas is discharged from the top of the condenser 39. A portion of the dry gas is used as fuel for driving oxygen plant 38. The fuel gas is burned with air 47 to develop the energy necessary to produce the required amount (or more if desired) of oxygen from air 48. The fuel gas may be used directly as for example in a gas turbine, or indirectly to produce steam or electricity to power the oxygen plant 38. The oxygen plant 38 may be of any conventional type, such as a cryogenic distillation plant or a selective adsorption plant. If the latter, it may operate either as a pressure swing or as a thermal swing type of operation. Each of these types of oxygen plant is well known in the art. The combustion of air 47 and fuel 46 produces a flue gas 49 and energy which is caused to react upon air 48 in the oxygen plant 38, separating oxygen 32 from the nitrogen and the rare gases 50. The latter may be vented or recovered. The oxygen 32 is then fed into furnace 33 as previously described.

The liquid effluent 51 discharged from scrubber 36 flows into a settling tank 52 where it separates into an upper organic phase 53 and a lower aqueous phase 54. The lower aqueous phase 54 is fed to a filter 55 which separates the fly ash 56 from the water 57. A portion of the clarified water 57 is recycled through line 58 into the scrubber 36, while the excess water 59 is discharged from the system. The fly ash 56 is fed to a mixer 60 where it is mixed with the upper organic phase 53 discharged from settling tank 52. The mixture of fly ash and liquid organics 61 is then recycled to furnace 33.

Any conventional gas cleaning equipment, such as for example, electrostatic precipitators, bag filters or cycline separators may be used to clean the gas instead of a scrubber. Furthermore, the cleaning step and the drying step may be reversed in sequence, i.e. the scrubber 36 may be installed either before or after the condenser 39. When the cleaning step follows the drying step, the water from the condenser will be piped directly to the settling tank 52.

It can be seen that in an integrated system such as shown in FIG. 2 only refuse and air are used as raw materials and the only products of the system are a useful fuel or synthesis gas, dense residue composed of solid metal and slag, and a small quantity of waste water to be discarded after appropriate treatment. Furthermore, the oxygen-refuse converter system is self-supporting, using the condensed water to scrub the effluent gas from the furnace and using a portion only of the product gas to power the oxygen plant. Since only a minor portion of the gas is used as fuel to drive the oxygen plant, the major portion is left over and may be used as a clean (dry or wet) fuel or synthesis gas. Thus, it can be seen that when the system is viewed as a whole, it becomes a net producer of useful energy. In other words, the potential energy contained in the refuse, in a useless form, is converted into clean useful fuel gas, a premium product in increasingly scarce supply.

Figure 3:
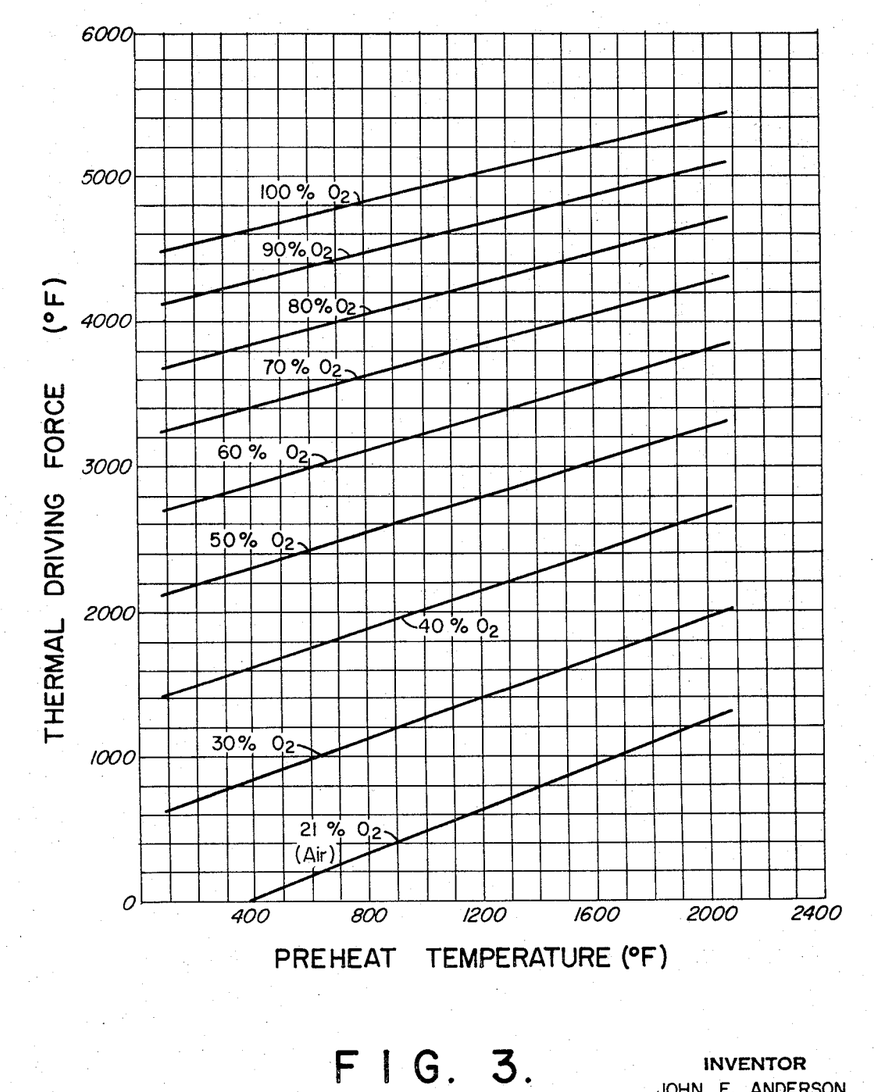
FIG. 3 is a graph illustrating the thermal driving force as a function of the oxidant gas preheat temperature for different concentrations of oxygen in the oxidant gas.

FIG. 3 illustrates the heat transfer difficulties encountered in an effort to maintain a temperature of 3000° F. at conditions reducing to iron in the hearth portion of a shaft furnace when using preheated air as the oxidant. A temperature of about 3000° F. is required in the hearth to insure that the metal and slag are sufficiently fluid to tap.

The "thermal driving force," the ordinate in the graph of FIG. 3, is a measure of the rate at which heat can be transferred at reducing conditions from the gaseous oxidant to the solid materials in the hearth when such solid materials are at or near 3000° F. The term, thermal driving force has the dimensions of temperature and is defined as the energy in the gas available for heat transfer above 3000° F. divided by the heat capacity of the combustion products. The energy may be present solely as sensible heat, in which case the thermal driving force is closely approximated by temperature level above 3000° F., or as a combination of sensible heat and dissociated species that can recombine to release energy at a solid surface.

At the hearth the combustion reaction can be expressed as follows:

$$2C(3000° F.) + O_2(T° F.) + RN_2(T° F.) = 2CO + RN_2$$

The char, which is essentially pure carbon, descends into the hearth preheated to a temperature near 3000° F. The oxidant enteres the furnace at a temperature T(° F.) depending upon its degree of preheat. Because of the reducing conditions in the hearth, carbon monoxide is the highest level of oxidation in the gas. The thermal driving force above 3000° F. can be calculated for conditions in the hearth by the following equation:

$$T^1 = \frac{77700 + J - 22900R}{8.6(2+R)}$$

wherein $T^1$ = Thermal Driving Force (° F.)
$J$ = Energy of preheat for oxidant above 80° F. (B.t.u./lb. mole of oxygen in oxidant)
$R$ = lb. mole $N_2$ per lb. mole $O_2$ in the oxidant.

The graphs in FIG. 3 show the large increase in thermal driving force that can be achieved by using oxygen enriched air or pure oxygen in place of preheated air. By using pure oxygen at room temperature, the thermal driving force (4500° F.) is increased more than fourfold over that for air preheated to 1800° F. (1100° F.). For proper operation over a wide range of refuse composition, it has been found that the thermal driving force must be in excess of about 1600° F. Consequently, it can be seen from FIG. 3 that the oxygen concentration in the oxidant gas should exceed 40% by volume if more than moderate preheating (400° F.) is to be avoided. In commercial operation, preheating of the oxidant is undesirable hence, it is preferable to use an oxidant having a concentration greater than about 42% oxygen, since such an oxidant is capable of achieving a thermal driving force greater than 1600° F. without any preheating.

It has been suggested in the art that an auxiliary fuel be added to preheated air in order to improve the rate of heat transfer to the hearth. However, this fails in many cases to be of any use; indeed, in many cases it can be detrimental, since it can cause a decrease rather than an increase in the thermal driving force. For example, if methane is added to the hearth and reacted with air preheated to 1800° F., the overall reaction would be:

$$CH_4 + 0.5O_2 + 1.88N_2 = CO + 2H_2 + 1.88N_2$$

When reducing conditions exist in the hearth, carbon dioxide and water vapor are thermodynamically unstable leaving carbon monoxide as the only oxygenated product of combustion. The equilibrium temperature for the combustion products under these conditions is only 1400° F. and the thermal driving force thus being below 3000° F. is negative. Therefore, the introduction of methane will cool the hearth rather than heat it. Consequently, it can be seen that the use of an auxiliary fuel may be useless for increasing heat transfer in the hearth.

It has been unexpectedly found that in accordance with the process of the present invention, a very low and critical amount of oxygen is required; namely, 0.15–0.28 lb. of oxygen/lb. of refuse. Such a small amount of oxygen can be used because the process of this invention has a high thermal efficiency and minimal energy losses. High thermal efficiency is achieved because the countercurrent operating conditions make maximum use of the high thermal driving force of the combustion products rising from the hearth, and because the mass flow rates between the rising gases and descending solids in the shaft are balanced. The high thermal driving force results in a high rate of heat exchange between rising gases and descending solids, causing the refuse to decompose quickly with minimal heat losses to the surroundings. A balance of masses between the rising gases and descending solids is required to insure that energy does not wastefully leave the reactor in the form of sensible heat. An example will illustrate this concept. For example, if one ton of refuse is fed in at the top of the furnace and 0.2 ton of $O_2$ is fed in at the base, then about one ton of gaseous products will be produced and discharged at the top of the furnace and about 0.2 ton of molten residue will be discharged at the base. Thus, the mass rates of rising gases and descending solids are very close in value and this balance is maintained throughout the shaft. At the top approximately one ton of gas leaves for each ton of refuse entering, and at the base 0.2 ton of $O_2$ enters and 0.2 ton of residue leaves. As a result of this balance, a very efficient heat exchange takes place between the passing streams in the shaft as evidenced by the fact that the temperature of the gas leaving the top of the shaft is only about 200° F. Hence, the energy loss due to sensible heat in the exit gas is almost negligible.

The advantages of maintaining the oxygen consumption ratio between 0.15–0.28 are numerous. Most obvious is the cost savings associated with a low feed rate of oxygen, namely, minimizing the high cost of pure oxygen. Equally important, is the fact that at a low oxygen consumption ratio the furnace hearth is maintained in a chemical reducing condition, a condition which enables the metals (primarily iron) to melt rather than becoming oxidized, and the carbon to dissolve in the metal, thus lowering its melting point rendering it more fluid and more easy to tap. Further advantages which result relate to the combustible gas leaving the shaft reactor. Operating within the critical weight ratio of oxygen/refuse in the reactor, viz, an amount substantially less than required for the stoichiometric combustion of the refuse, results in the production of a gas having a high concentration of combustible constituents such as carbon monoxide and hydrogen. Thus, the gas can be used as a chemical synthesis gas, such as, for example, in the synthesis of methanol or as a reducing gas in applications, such as the reduction of iron ore pellets to metallic iron. Alternatively, the fuel energy of the combustible gas can be utilized to advantage by burning the gas completely.

Although it is preferable to operate the process of the present invention in such manner that reducing conditions are maintained in the hearth, the process can be operated under mildly oxidizing conditions. Under mildly oxidizing conditions, the iron and other metals tend to become oxidized and the oxide becomes part of the slag. Under these conditions only one molten slag phase is formed in the base of the furnace, that is, the metal and slag do not form two separate phases as they do when reducing conditions are present in the hearth. However, even under the mildly oxidizing conditions, the oxygen to refuse ratio may not exceed the ratio of 0.28 to 1. The lower this ratio becomes, the more reducing will be the conditions in the hearth.

An indication of the high thermal efficiency obtained in the process of the present invention is the high burning rate which can be achieved. Burning rate, defined as the pounds of refuse consumed per hour per square foot of cross-sectional area of the furnace, are typically about 60 lbs./hr./sq. ft. for conventional incineration processes. In the practice of the present invention, burning rates greater than 250 lbs./hr./sq. ft. are easily achieved, thereby improving the overall efficiency of the process and reducing the size of the furnace needed to consume a given quantity of refuse.

A further significant difference between the present invention and prior art incineration processes resides in the nature of the gas leaving the shaft furnace. One important difference is that the concentration of water on the gas produced by the process of this invention is within the range of 25 to 55%, typically about 40% by volume, even though the total amount of water which is produced per ton of refuse consumed is less than that produced in conventional incinerators. By contrast, the concentration of water vapor in the exit gas of a typical conventional incinerator is only about 10% water. The high concentration of water vapor permits it to be efficiently removed from the gas produced by the present invention and further, makes it possible to use the condensed water as a cleaning fluid for the gas in a scrubber. In this way, the water pollution problem normally caused by the addition of fresh water to the scrubber is minimized.

However, the principal difference in the nature of the gas produced is its composition. Specifically, the gas leaving the shaft furnace has a concentration, on a dry basis, of carbon monoxide and hydrogen in excess of 50% by volume and within the ranges shown in Table I. When pure oxygen is used as the oxidant and a municipal refuse of average composition is used as the feed, the concentration of carbon monoxide and hydrogen are about 50 and 30 volume percent respectively. Thus, a fuel value in excess of 200 B.t.u./cu. ft. at 70° F. atmospheric pressure can be routinely achieved.

An integral and important feature of the present invention concerns the stage in the process at which gas cleaning (i.e. scrubbing and drying) occurs, namely, immediately after the gas is withdrawn from the shaft furnace. Unlike the prior art wherein the gas cleaning step takes place only after the stack gases are completely burned in a secondary combustion chamber, in order to reduce air pollution by the vented gases, the process of the present invention is not burdened with cleaning a large volume flue gas; rather, only a relatively small volume of gas needs to be cleaned. Since the total quantity of pollutants remaining in a gas stream after cleaning is directly proportional to the volume of the stream, the effect of concentrating the pollutant material prior to cleaning is to significantly lower the quantity of pollutants ultimately released to the atmosphere.

The small volume of gas leaving the shaft furnace in the present invention is attributable to several factors: (1) the low weight ratio of oxygen to refuse causing non-stoichiometric combustion, with conesquent lower molar quantities of combustion products being produced than there would be for complete combustion, (2) the use of pure oxygen enriched air resulting in only minimal, if any, nitrogen dilution, and (3) the low exit temperature of the gas leaving the shaft furnace resulting from the high overall thermal efficiency of the furnace. This temperature is several hundred degrees lower than the exit stack gas temperature in the secondary combustion chamber of a conventional incinerator.

It has been found that in operation of the process that the combustible gas leaving the top of the shaft furnace 33 contains a mist of condensed organic liquid droplets in addition to fly ash. This mixture of liquid organics and fly ash sometimes forms a sticky mass that adheres to the walls of line 35 and may eventually build up to a degree where it may plug up the line. It has been found that the addition of a water or other liquid spray into the gas stream inside of line 35 near the furnace gas discharge port will prevent the formation of the sticky mass and thereby keep the walls of the gas line 35 clean. Recycled water from line 57 may be used for this purpose.

For safe operation of the process it is necessary to maintain the pressure within the apparatus slightly above atmospheric. A slight positive pressure, at least ¼" of water is necessary to insure that there is no flow of air into the furnace. Inasmuch as the gas produced in the furnace is a highly combustible mixture, serious explosions may occur if air is allowed to leak in from the surrounding atmosphere. Thus, sub-atmospheric pressures such as are common within conventional incinerator cannot be tolerated in the process of the present invention.

The following examples will serve to illustrate the manner in which the process of the present invention is carried out, specifically as it relates to operation of the furnace.

EXAMPLE 1

A shaft furnace about 8 feet high and having a cross-sectional area of about 90 sq. in. such as shown in FIG. 1 was used. Pure oxygen was fed into the furnace at a rate of 365 c.f.h. at the bottom of the shaft, while refuse consisting of wood, paper, water, metal and glass was fed at a rate of 133 lbs./hr. at the top of the shaft. The approximate composition of the refuse was as follows:

|  | Weight percent |
| --- | --- |
| Free moisture | 23.2 |
| Carbon | 25.8 |
| Hydrogen | 3.6 |
| Oxygen | 28.8 |
| Metal | 8.7 |
| Glass | 9.9 |
| Total | 100.0 |

During steady state operation molten metal and glass flowed continuously from the tap hole at the base of the furnace. The flue gas leaving the top of the shaft had a flow rate 24.9 c.f.m. measured dry and 46 c.f.m. measured wet, and an average flue gas temperature of 200° F. This corresponds to 22,500 c.f. (dry)/ton of refuse or 42,000 c.f. (wet)/ton of refuse. The oxygen consumption was 0.22 ton oxygen/ton of refuse and the burning rate was 212 lbs. refuse/hr./sq. ft. of shaft cross-sectional area. Analysis of the flue gas (on a dry basis) was as follows:

|  | Vol. percent |
| --- | --- |
| Carbon monoxide | 47.5 |
| Hydrogen | 28.4 |
| Carbon dioxide | 17.2 |
| Nitrogen | 0.3 |
| Methane | 5.5 |
| Higher hydrocarbons | 0.5–1.5 |

The heating value of the gas was 310 B.t.u./cu. ft. at 70° F. and atmospheric pressure.

EXAMPLE 2

The furnace and composition of the refuse were the same as that in Example 1. Oxygen was fed to the furnace at a rate of 490 c.f.h. while refuse was fed at a rate of 182 lbs./hr. After steady state had been achieved, molten metal and glass flowed continuously from the tap hole at the base of the furnace. The combustible gas leaving the top of the shaft furnace ranged in flow rate from 31.0 to 36.5 c.f.m. measured dry, and from 59 to 70 c.f.m. measured wet, and had an average temperature of 200° F. This corresponds to 20,000 to 24,000 dry c.f./ton refuse or 39,000 to 46,000 wet c.f./ton refuse. The oxygen consumption was 0.22 ton oxygen/ton refuse and the burning rate was 290 lbs. refuse/hr./sq. ft. of shaft cross-sectional area. The range of combustion analyses obtained (on a dry basis) for the gas samples taken during operation are given below:

|  | Vol. percent |
| --- | --- |
| Carbon monoxide | 49.4–50.8 |
| Hydrogen | 27.8–28.6 |
| Carbon dioxide | 15.4–16.1 |
| Nitrogen | 0.2–0.2 |
| Methane | 4.1–5.3 |
| Higher hydrocarbons | Balance |

The calculated heating value of the gas varied from 304 to 315 B.t.u./c.f. at 70° F. and atmospheric pressure.

EXAMPLE 3

The furnace and composition of the refuse were the same as that in Example 1. Oxygen was fed to the furnace at a rate of 650 c.f.h. while refuse was fed at a rate of 236 lbs./hr. After steady state had been achieved, molten metal and glass flowed continuously from the tap hole at the base of the furnace. The gas leaving the top of the shaft furnace ranged in flow rate from 41.6 to 45.3 c.f.m. measured dry, and from 82 to 88 c.f.m. measured wet, and had an average flue gas temperature of 230° F. This corresponds to 21,000 to 23,000 dry c.f./ton refuse or 42,000 to 45,000 wet c.f./ton refuse. The oxygen consumption was 0.22 ton oxygen/ton refuse and the burning rate was 376 lbs./hr. sq. ft. of cross-sectional shaft area. The range of composition analyses obtained (on a dry basis) on the flue gas samples taken during operation are given below:

|  | Vol. percent |
| --- | --- |
| Carbon monoxide | 47.3–54.0 |
| Hydrogen | 29.4–30.5 |
| Carbon dioxide | 11.4–16.4 |
| Nitrogen | 0.3–0.4 |
| Methane | 3.8–4.5 |
| Higher hydrocarbons | Balance |

The calculated heating value of the gas varied from 306 to 318 B.t.u./c.f. at 70° F. and atmospheric pressure.

In each of the three examples above, the molten metal and fluid slag tapped from the base of the shaft furnace was permitted to fall into a water tank where it solidified as particulate particles of metal and slag such that the metal particles could visually be distinguished from the slag and easily separated therefrom.

What is claimed is:

1. A process for disposing of refuse by converting it to useful gaseous products and inert compact, solid residue, comprising the steps of:
   (1) providing a substantially vertical shaft furnace having a drying zone in the top portion, a thermal decomposition zone in the mid-portion and a combustion and melting zone in the bottom portion thereof,
   (2) feeding refuse containing a combustible organic portion and a non-combustible inorganic portion into the upper portion of said drying zone,
   (3) feeding a gas containing at least 40 percent oxygen by volume into said combustion and melting zone, in an amount such that the weight ratio of oxygen to refuse entering the shaft furnace is in the range of from about 0.15–0.28 to 1,
   (4) thermally decomposing in said thermal decomposition zone, the organic portion of said refuse to char and gaseous material by direct contact with the hot combustion gases rising from the combustion and melting zone,
   (5) combusting the char, which descends into the combustion and melting zone, with said oxygen containing feed gas to produce hot gaseous products, primarily carbon monoxide and hydrogen, thereby generating sufficient heat at a sufficiently high thermal driving force to melt or fluidize the inorganic portion of said refuse,
   (6) discharging gaseous products produced in said shaft furnace from the drying zone, said gaseous products being characterized by containing, on a dry volume basis, at least 50% hydrogen and carbon monoxide, and having a heating value greater than 200 B.t.u./c.f. of dry gas at 70° F. and atmospheric pressure, and
   (7) discharging the molten or fluidized residue from the combustion and melting zone and thereafter permitting same to solidify into a compact inert residue.

2. The process of claim 1 wherein the thermal driving force in the combustion and melting zone is maintained at a value greater than 1600° F.

3. The process of claim 1 wherein a refuse burning rate greater than 250 lbs./hr./sq. ft. of shaft furnace cross-sectional area is maintained.

4. The process of claim 1 wherein the weight ratio of oxygen to refuse fed to the shaft furnace is maintained in the range of from about 0.18–0.25 to 1.

5. The process of claim 1 wherein the oxygen containing gas fed to shaft furnace contains at least 42% oxygen by volume and is at ambient atmospheric temperature.

6. The process of claim 1 wherein the oxygen containing gas fed to the shaft furnace is substantially pure oxygen gas at ambient atmospheric temperature.

7. The process of claim 1 wherein the gaseous products discharged from the drying zone of said shaft furnace are characterized by having an average temperature, at their point of discharge from the shaft furnace, below 500° F.

8. The process of claim 1 wherein the gaseous products discharged from the drying zone of said shaft furnace are characterized by having an average temperature, at their point of discharge from the shaft furnace, in the range of 180–250° F.

9. The process of claim 1 wherein the gaseous products discharged from the drying zone of said shaft furnace are characterized by having a heating value in the range of 250–350 B.t.u./c.f. of dry gas at 70° F. and atmospheric pressure.

10. The process of claim 1 wherein reducing conditions are maintained in said shaft furnace, thereby substantially preventing over oxidation of the char to $CO_2$ and oxidation of the metallic components of said refuse.

11. The process of claim 1 wherein the pressure within said shaft furnace is maintained above atmospheric pressure, thereby preventing leakage of air into said furnace.

12. The process of claim 1 wherein the gaseous products discharged from the drying zone of said shaft furnace are cleaned to remove pollutants therefrom.

13. The process of claim 12 wherein the cleaning is accomplished by scrubbing with water and the scrubbed gas is thereafter dried to remove its moisture content, thereby producing a clean, dry gaseous product.

14. An integrated system which disposes of refuse and at the same time is capable of producing useful energy in excess of that required for operation of the system in the form of gas having a fuel value greater than 200 B.t.u./c.f. at 70° F. and atmospheric pressure, comprising the steps of:
   (1) thermally decomposing refuse fed into a shaft furnace into which a gas is also fed containing at least 40% $O_2$ by volume at such rate that the weight ratio of $O_2$ to refuse is maintained in the range of 0.15–0.28 to 1, thereby creating a sufficiently high thermal driving force in the hearth of such shaft furnace to melt or fluidize the inorganic portion of said refuse which is discharged from the base of said furnace, and producing a gas discharged from the top portion of said furnace having a temperature below 500° F., a moisture content of from about 25 to 55% by volume and containing at least 50% by volume on a dry basis of CO and $H_2$,
   (2) cleaning the gas discharged from said furnace of pollutants,
   (3) separating a minor portion of the cleaned gas from the major portion thereof, and feeding said minor portion to an oxygen plant wherein it is burned to produce the energy required for operation of the oxygen plant,
   (4) utilizing said energy to separate oxygen from air fed into said oxygen plant, and feeding the oxygen produced into said shaft furnace in accordance with step (1), whereby the major product portion of the cleaned gas produced by the system remains available for use.

15. The process of claim 14 wherein the thermal driving force in the combustion and melting zone of said shaft furnace is maintained at a value greater than 1600° F.

16. The process of claim 14 wherein a refuse burning rate greater than 250 lbs./hr./sq. ft of shaft cross-sectional area is maintained.

17. The process of claim 14 wherein the oxygen containing gas fed to the shaft furnace is substantially pure oxygen gas.

18. The process of claim 14 wherein the gaseous products discharged from said shaft furnace are characterized by having an average temperature, at their point of discharge from the shaft furnace, in the range of 180–250° F.

19. The process of claim 14 wherein the gaseous products discharged from said shaft furnace are characterized by having a heating value in the range of 250–350 B.t.u./c.f. of dry gas at 70° F. and atmospheric pressure.

20. The process of claim 14 wherein reducing conditions are maintained in said shaft furnace, thereby substantially preventing over oxidation of the char to $CO_2$ and oxidation of the metallic components of said refuse.

21. The process of claim 14 wherein the pressure within said shaft furnace is maintained above atmospheric pressure, thereby preventing leakage of air into said furnace.

22. The process of claim 14 wherein the cleaning step consists of scrubbing the gas with water.

23. The process of claim 22 wherein the system contains the following additional steps: (5) drying the scrubbed gas by condensing the water vapor therefrom, (6) collecting the liquid effluent resulting from the scrubbing step and separating the same into an organic phase and an aqueous phase containing fly ash, (7) filtering the fly ash from the aqueous phase, (8) recycling a portion of the filtered aqueous phase to the scrubber and using same together with the condensate from the condenser as the water for the scrubbing step, and (9) mixing the filtered fly ash with said organic phase and recycling the mixture to the shaft furnace.

24. The process of claim 1 wherein the non-combustible inorganic portion of the refuse comprises metal and slag forming constituents, and wherein the molten or fluidized residue discharged from the combustion and melting zone comprise molten metal and fluid slag.

25. The process of claim 14 wherein the non-combustible inorganic portion of the refuse comprises metal and slag forming constituents, and wherein the molten and fluidized products discharged from the combustion and melting zone comprise molten metal and fluid slag.

References Cited

UNITED STATES PATENTS

| | | | |
|---|---|---|---|
| 3,648,629 | 3/1972 | Southwick | 110—8 R |
| 3,471,275 | 10/1969 | Borggreen | 48—209 |
| 3,241,327 | 3/1966 | La Fleur | 62—40 |
| 3,511,194 | 5/1970 | Stookey | 110—31 |

FOREIGN PATENTS

| | | | |
|---|---|---|---|
| 769,629 | 6/1934 | France | 110—8 B |

JOHN J. CAMBY, Primary Examiner

U.S. Cl. X.R.

48—209; 110—8, 18